(No Model.) 2 Sheets—Sheet 1.
B. A. FISKE.
POSITION FINDER.
No. 510,418. Patented Dec. 12, 1893.
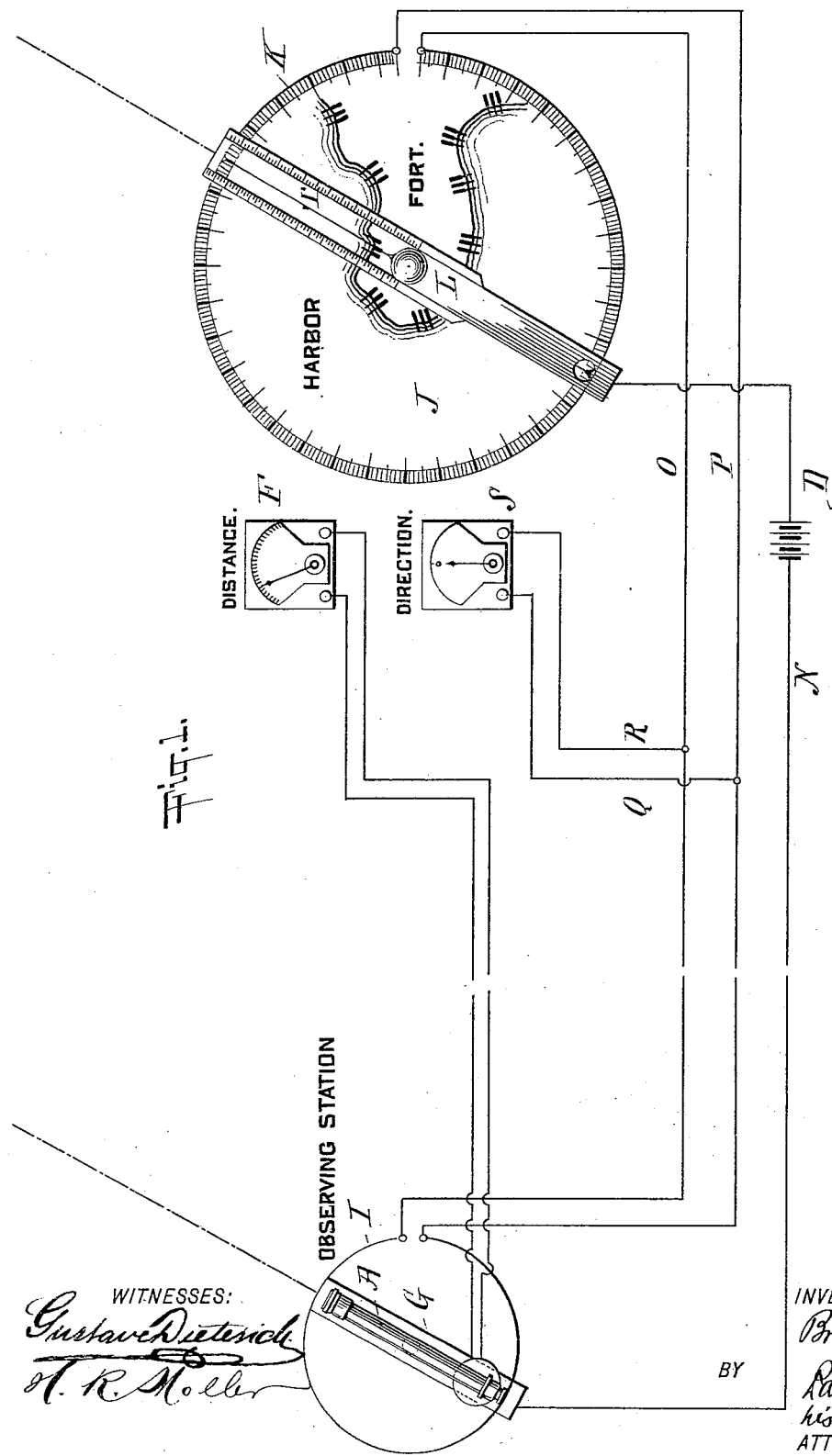

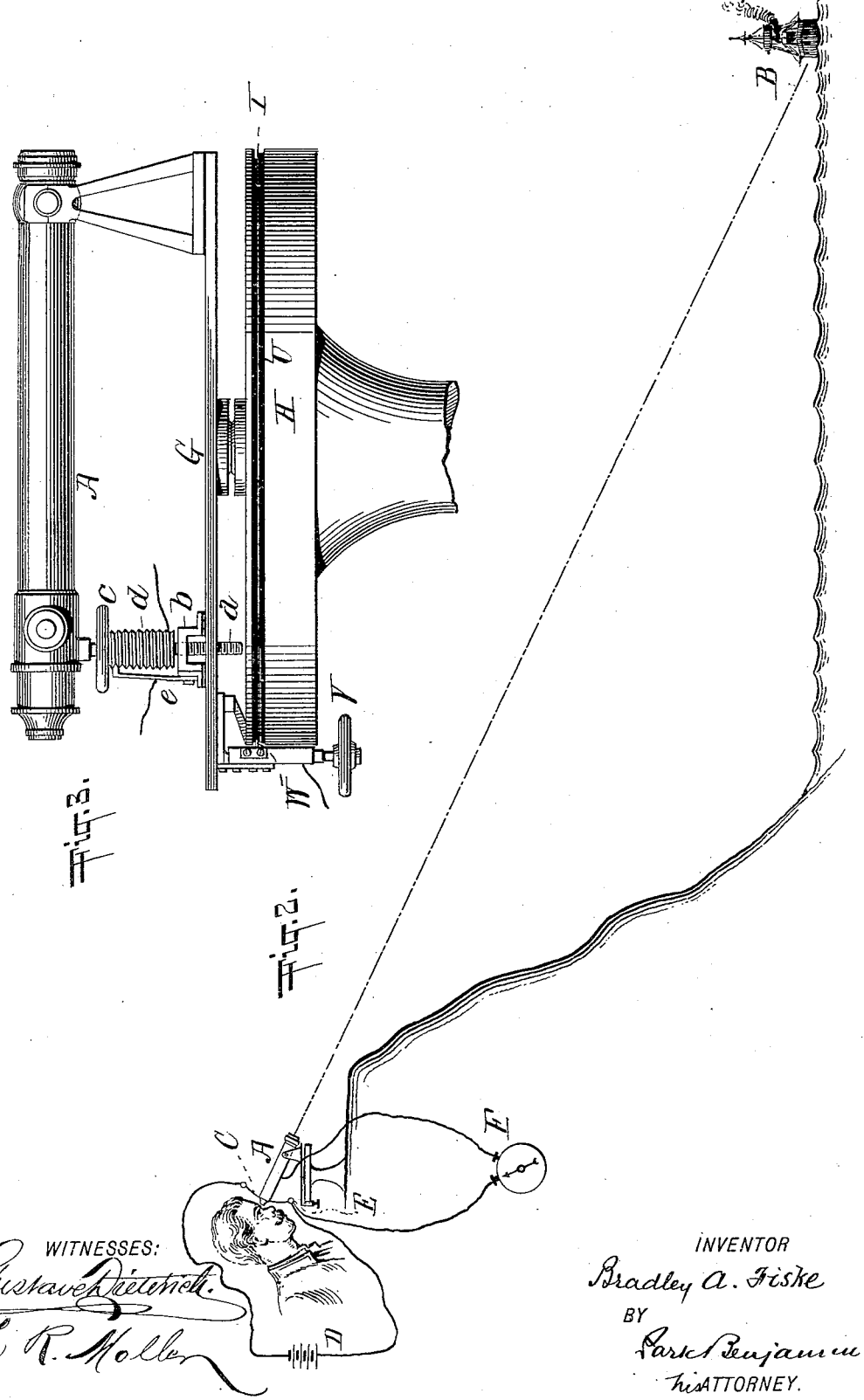

UNITED STATES PATENT OFFICE.

BRADLEY A. FISKE, OF THE UNITED STATES NAVY.

POSITION-FINDER.

SPECIFICATION forming part of Letters Patent No. 510,418, dated December 12, 1893.

Application filed April 10, 1893. Serial No. 469,685. (No model.)

*To all whom it may concern:*

Be it known that I, BRADLEY A. FISKE, of the United States Navy, have invented a new and useful Improvement in Position-Finders, of which the following is a specification.

The invention consists in an apparatus for determining the distance of an object and its bearing with reference to a certain locality. It is intended for use more particularly as a position finder, to be employed on shore, as, for example, in a fortified place at the entrance of a harbor. It enables the position of a ship or other object afloat to be accurately determined, and thus renders it possible to train a gun or a battery of guns upon such object so that the projectile or projectiles will strike the same.

The apparatus consists in two principal parts; namely, a device for determining the distance and a device for determining the direction or bearing of the object. The said two parts are used conjointly, and thereby the location of the object may be recognized upon a chart representing the area of the harbor, for example, drawn on a reduced scale.

In the accompanying drawings, Figure 1 is a diagram illustrating the operation of the distance or range finder. Fig. 2 is a diagram illustrating the operation both of the range finder and of that part of the apparatus which shows the bearing of the distant object. Fig. 3 is a side elevation of the observer's instrument and shows the mechanism thereof on a larger scale and in detail.

Similar letters of reference indicate like parts.

Referring first to Fig. 2, A is a telescope, sight-bar, or other like means of directing the line of sight, indicated by the dotted line, upon the object B. This telescope is to be located upon an elevation adjacent to the waterway to be protected. The telescope is pivoted at its outer end, so that it can be depressed through any desired angle in order to bring it to bear upon the object. The telescope is provided near its sight end with a contact piece or wiper which always bears upon a body of conducting material, represented symbolically at C, Fig. 2. Connected with the ends of the body C is a voltaic battery, D, and connected in circuit with one end, E, of the body C and with the movable wiper or contact piece carried by the telescope A, is a galvanometer, F. It will be apparent that as the telescope A is moved on its pivot, its contact piece or wiper will be carried along the body C; and, as a consequence, a greater or less amount of the body C will be brought into the circuit which includes the galvanometer F. Inasmuch as the body C is to be constructed of, for example, a wire of uniform resistance per unit of length, it is obvious that as the telescope A is moved and a greater or less length of said wire is brought into the galvanometer circuit the resistance thus interposed in said circuit will be increased or diminished; and as this length, and hence this resistance, depends upon the angle of depression of the telescope, it becomes a function of the angle of depression; and, equally, the deflection of the galvanometer F, due to this change, is also a function of the angle of depression. Therefore, knowing the height of the telescope above the level of the object, the galvanometer deflection will indicate the distance of the object from the telescope, for which purpose the galvanometer may be once for all graduated in any suitable unit, such as meters or yards. Hence, if the galvanometer be located at a station distant from that telescope, an observer at that distant station, by reading the galvanometer, can recognize at once the distance of the object, while the person stationed at the telescope has nothing to do but to keep it properly directed upon the object.

The telescope pivot is carried upon a bar, G, Fig. 3, which is pivoted upon a circular table, H. Placed in a groove around the periphery of this table is a wire, I, Fig. 1, of conducting material, having a uniform resistance per unit of length. Upon the bar G is supported a contact piece or wiper, as will be more particularly explained hereinafter with reference to Fig. 3, which contact piece or wiper always bears upon the wire I. At the distant station, Fig. 1, there may be arranged a circular table, J, having around its periphery a wire, K, similar in all respects to the wire I. Upon the table J is pivoted a bar, L, which bar L carries a wiper or contact point which constantly presses upon the wire K. The contact point on the bar G and the contact point on the bar L are connected by a wire, N, which also includes the battery D. The ends of the wires K and I are connected by wires O and P, and said wires O and P are respectively connected to wires Q and R which lead to the terminals of a galvanometer, S. It will be obvious, by a simple inspection of the drawing, Fig. 1, that the wires I and K at the separated stations and the pivoted bars G and L, together with the battery and the galvanometer S, are connected in Wheatstone bridge circuit, and that a movement of either the bar L or the bar G, displacing the contact pieces over the wires K or I, will vary the resistance of the bridge arms so that the bridge may be brought into or out of equilibrium by the movement of these bars upon their pivots; and further, it will be obvious that the fact when equilibrium is produced in the bridge will be made manifest by the movement of the pointer of the galvanometer S. The construction is to be such therefore, and the instruments at the separated stations are to be placed with reference to one another so that when the bar L makes the same azimuth angle with reference to one end of its wire K as does the bar G, then the bridge will balance and the galvanometer S will show zero; so that if the telescope A, and consequently the bar G parallel thereto, be directed upon the object, the galvanometer S will indicate zero when the bar L is placed similarly to the bar G. If then, on the table J there be disposed a chart of the area to be protected on a reduced scale, such, for example, as is shown in Fig. 1, the direction of the object from the point of observation will be indicated by the position of the bar L. For convenience in this respect the bar L is made with an opening containing a longitudinal wire, T; the position of the object on the chart being of course along this wire; also on the sides of the opening in the bar L may be marked a scale of distances, in yards or meters.

The operation of the whole apparatus is therefore as follows: The telescope A is depressed, and also moved in azimuth, until aligned with the object. Inasmuch as the distance of the object depends, as has already been explained, upon the angle of depression, and as this angle is measured by the galvanometer F in terms of distance, it is plain that if the galvanometer F be located at the station distant from the observer, then from that instrument the distance of the object can at once be read off. Simultaneously the movement of the telescope A in azimuth disturbs the balance of the bridge which includes the galvanometer S. The observer at the distant station then moves the bar L until the galvanometer S, placed near to him, shows zero. When this is done, the position of the object will be somewhere along the line of the wire T; and its exact point along that wire T is immediately found by noting on the scale on the bar L the distance corresponding to that shown by the galvanometer F. The bearing and distance of the object thus being ascertained, it remains simply to communicate this information, by any suitable means, to the guns or battery.

It will be apparent that one of the great advantages of this instrument is that it is directed by a single observer, and that the simple operation of aligning it with the target instantly causes, at the distant station, (the bar L there being suitably manipulated) indications from which the bearing and distance of the object may at once be recognized.

Referring now to Fig. 3, there is here illustrated, in detail, the mechanical construction of the telescope A and its supports. The table H may be of any suitable material, and should have embedded in it a ring, U, of hard rubber or other insulating material, in which ring is the groove in which is placed the wire I. The bar G is conveniently rotated on its pivot by means of the hand-wheel V, the support for which wheel carries the contact point or wiper W. The inner end of the telescope A is supported on the vertical screw $a$, which passes through the fixed nut $b$ which is carried on, but insulated from, the bar G; the insulation being placed below the nut. The screw $a$ is rotated to depress and lower the telescope by means of the hand-wheel $c$. Secured upon the screw is a cylinder, $d$, of ebonite, having upon its surface a spiral groove in which is laid the German silver wire corresponding to the body C, Fig. 2. $e$ is a contact spring which always bears upon the wire C, and this spring is supported upon, but insulated from, the nut $b$. In this device, instead of causing the telescope A to carry the contact and move it over a fixed body, C, as in Fig. 2, the body C, by the rotation of the screw $a$, is made to move under the fixed contact piece $e$; the relation of the parts being thus merely reversed. The circuit connections are the same as is indicated in Fig. 1; that is to say, the battery terminals lead to both ends of the wire C wrapped upon the cylinder $d$, and the terminals of galvanometer F connect respectively with the contact wiper $e$ and one end of the wire C. The movement of the telescope A in azimuth is three hundred and fifty degrees.

I claim—

1. A depression range finder having a sight-bar or telescope pivoted to move in a vertical plane, a body of conducting material and an electrical measuring instrument in circuit with said body and said telescope; the said parts being constructed and operating so that varying angles of depression of the telescope shall correspondingly vary the length of the conducting body in circuit, and thus cause an indication by said measuring instrument corresponding to the angle of depression and hence to the distance of the object upon which the telescope is directed, substantially as described.

2. In combination with a depression range finder constructed and operating as set forth, two bodies of conducting material located at distant stations, two contact pieces maintained in contact with said bodies, one of said contact pieces being controlled by the telescope of said depression range finder, and the other by a pivoted bar, and the said contact pieces, conducting bodies, a galvanometer and a battery being connected in Wheatstone bridge circuit; said parts being constructed and operating so that when said bar at said distant station is adjusted at the same azimuth angle as said telescope, the galvanometer will indicate zero, substantially as described.

3. A position finder substantially as hereinbefore described containing a depression range finder and a device for showing the bearing of the object upon a chart or map, the said apparatus being electrically operated and controlled to indicate the distance and bearing of the object by the alignment of a single sight-bar or telescope located at an observing station upon said object, substantially as described.

4. The combination in a range finder of a telescope or sight-bar pivoted to move in a vertical plane, a wire of conducting material, a plate or wiper making contact with said wire, means for controlling the position of said wiper longitudinally along said wire by the movement of said telescope on its pivot, an electrical indicating instrument and circuit connections, substantially as described.

5. The combination in a range finder of a telescope or sight-bar pivoted to move in a vertical plane, a wire of conducting material, a fixed wiper or plate in contact with said wire, a means of elevating or depressing said telescope, an electrical measuring instrument and circuit connections, substantially as described; the said parts being constructed and arranged so that when said means of elevating or depressing said telescope is operated, the position of said wiper longitudinally along said wire will be correspondingly varied.

6. The combination of a telescope or sight-bar pivoted to move in a vertical, and also in a horizontal, plane, two elongated bodies of conducting material, two wipers or contact points making contact respectively with said bodies, means for controlling the position of said wipers along said bodies by the movement in altitude and azimuth respectively of said telescope, two electrical indicating instruments respectively connected with said bodies and circuit connections, substantially as described.

7. The combination in a range finder of a telescope or sight-bar pivoted to move in a vertical plane, a screw for elevating and depressing said telescope, a wire of conducting material spirally wound upon the periphery of the screw shaft and moving therewith, a fixed contact point or wiper bearing upon said wire, an electrical indicating instrument and circuit connections, substantially as described.

BRADLEY A. FISKE.

Witnesses:
JAMES S. GREVES,
EDWARD A. NICKES.